United States Patent
Batori et al.

(10) Patent No.: US 11,533,938 B2
(45) Date of Patent: Dec. 27, 2022

(54) METHOD OF PRODUCING A THICKENED CARBONATED BEVERAGE PACKED IN A CONTAINER, AND A THICKENED CARBONATED BEVERAGE PACKED IN A CONTAINER

(71) Applicant: Daiwa Can Company, Tokyo (JP)

(72) Inventors: Hiroshi Batori, Sagamihara (JP);
Hiroshi Endou, Sagamihara (JP);
Yoshinari Suganuma, Sagamihara (JP);
Takashi Aizawa, Sagamihara (JP)

(73) Assignee: Daiwa Can Company, Tokyo (JP)

( * ) Notice: Subject to any disclaimer, the term of this patent is extended or adjusted under 35 U.S.C. 154(b) by 540 days.

(21) Appl. No.: 16/442,887

(22) Filed: Jun. 17, 2019

(65) Prior Publication Data

US 2019/0297933 A1 Oct. 3, 2019

Related U.S. Application Data

(63) Continuation of application No. PCT/JP2017/045180, filed on Dec. 15, 2017.

(30) Foreign Application Priority Data

Dec. 20, 2016 (JP) .............................. JP2016-246992

(51) Int. Cl.
| | |
|---|---|
| *A23L 29/20* | (2016.01) |
| *A23L 2/54* | (2006.01) |
| *B65D 85/72* | (2006.01) |
| *A23L 2/00* | (2006.01) |
| *A23L 29/269* | (2016.01) |
| *A23L 29/256* | (2016.01) |
| *A23L 29/231* | (2016.01) |
| *A23L 29/238* | (2016.01) |
| *A23L 2/52* | (2006.01) |

(52) U.S. Cl.
CPC .............. *A23L 29/20* (2016.08); *A23L 2/00* (2013.01); *A23L 2/52* (2013.01); *A23L 2/54* (2013.01); *A23L 29/231* (2016.08); *A23L 29/238* (2016.08); *A23L 29/256* (2016.08); *A23L 29/269* (2016.08); *B65D 85/72* (2013.01)

(58) Field of Classification Search
CPC ...... A23L 29/238; A23L 29/20; A23L 29/231; A23L 29/256; A23L 2/54; A23L 29/269; A23L 2/52; A23L 2/00; B65D 85/72
USPC ........................................................ 426/573
See application file for complete search history.

(56) References Cited

U.S. PATENT DOCUMENTS

2010/0310724 A1   12/2010   Nakata et al.

FOREIGN PATENT DOCUMENTS

| CN | 101848654 A | 9/2010 |
|---|---|---|
| JP | 2001-299297 A | 10/2001 |
| JP | 2009-112236 A | 5/2009 |
| JP | 4386380 B1 | 12/2009 |
| JP | 2010-041955 A | 2/2010 |
| JP | 2010-068747 A | 4/2010 |
| JP | 2013-135665 A | 7/2013 |
| JP | 2014-176322 A | 9/2014 |
| JP | 2015-126758 A | 7/2015 |
| JP | 2015-173631 A | 10/2015 |
| WO | 2009-060314 A2 | 5/2009 |
| WO | WO-2016/024597 A1 | 2/2016 |
| WO | WO-2016/063698 A1 | 4/2016 |

OTHER PUBLICATIONS

Machine translation of JP2010068747A (Year: 2010).*
International Search Report for corresponding PCT/JP2017/045180 dated Mar. 13, 2018, 4 pages.
International Preliminary Report on Patentability issued in PCT/JP2017/045180 dated Jun. 25, 2019; ISA/JP (18 pages).
Extended European Search Report dated Sep. 22, 2020 for Application No. 17882403.3 (9 pages).
Taiwanese Office Action for Application No. 106144692 dated Mar. 15, 2021 with English translation (12 pages).
Japanese Office Action dated Aug. 31, 2021 for Japanese Patent Application No. 2018-557745 with English translation (14 pages).
Chinese Office Action dated Jan. 13, 2022 for Chinese Application No. 201780078768.2 (with English translation) (27 pages).
Korean Office Action dated Jun. 13, 2022 for Application No. 10-2019-7021228 with English translation (16 pages).
Chinese Second Office Action dated Jun. 13, 2022 for Application No. 201780078768.2 with English translation (17 pages).

* cited by examiner

*Primary Examiner* — Subbalakshmi Prakash
(74) *Attorney, Agent, or Firm* — Harness, Dickey & Pierce, P.L.C.

(57) ABSTRACT

A method of producing a thickened carbonated beverage packed in a container, comprising: mixing an aqueous solution containing a first thickening agent and having a temperature of 0 to 35° C. with a second thickening agent insoluble in water in a temperature range of 0 to 35° C. but soluble in water at a temperature of 60° C. or more to obtain a stock liquid with the second thickening agent dispersed in the solution; dissolving carbon dioxide gas in the stock liquid to obtain a carbonated aqueous solution; filling a container with the carbonated aqueous solution and sealing the container to obtain the carbonated aqueous solution packed in the container; and heating the carbonated aqueous solution packed in the container such that the carbonated aqueous solution has a temperature of 60° C. or more to dissolve the second thickening agent in the solution.

9 Claims, No Drawings

METHOD OF PRODUCING A THICKENED CARBONATED BEVERAGE PACKED IN A CONTAINER, AND A THICKENED CARBONATED BEVERAGE PACKED IN A CONTAINER

CROSS-REFERENCE TO RELATED APPLICATIONS

This application is a Continuation Application of PCT Application No. PCT/JP2017/045180 filed Dec. 15, 2017 and based upon and claiming the benefit of priority from Japanese Patent Application No. 2016-246992 filed Dec. 20, 2016, the entire contents of which are incorporated herein by reference.

FIELD

1. Field of the Invention

The present invention relates to a method of producing a thickened carbonated beverage packed in a container, and a thickened carbonated beverage packed in a container.

BACKGROUND

2. Description of the Related Art

A swallowing disorder occurs due to cerebral disorders such as stroke and Parkinson's disease or decreased muscle strength caused by aging. A person with a swallowing disorder may experience aspiration, which means food or beverages enter the airway when swallowing. Also, food or beverages reaching the lung due to aspiration may cause pneumonia. Therefore, a thickening agent is added to a beverage to thicken the beverage, so that swallowing is facilitated and aspiration is prevented (Jpn. Pat. Appln. KOKAI Publication No. 2001-299297).

SUMMARY

There is also a demand for carbonated beverages that are thickened to make it easy for a person with a swallowing disorder to swallow. However, carbonated beverages are more difficult to handle than regular beverages.

When producing a thickened carbonated beverage, the present inventors needed to stir a carbonated beverage in order to dissolve a thickening agent in the carbonated beverage, but the stirring caused the problem that carbon dioxide gas escaped from the beverage. Also, when dissolving carbon dioxide gas in a beverage that had been thickened in advance to produce a thickened carbonated beverage, the carbon dioxide gas hardly dissolved in the viscous beverage, making it impossible to dissolve a sufficient amount of carbon dioxide gas in the beverage. Also, when filling a container with the resultant thickened carbonated beverage, the beverage spilled out of the container, resulting in the problem that the liquid amount in the container varied.

Accordingly, an object of the present invention is to provide a method for stably producing a thickened carbonated beverage packed in a container and containing a sufficient amount of carbon dioxide gas, and to provide a thickened carbonated beverage packed in a container, produced by the method.

According to a first aspect of the present invention, there is provided a method of producing a thickened carbonated beverage packed in a container, the method comprising:

mixing an aqueous solution containing a first thickening agent and having a temperature of 0 to 35° C. with a second thickening agent which is insoluble in water in a temperature range of 0 to 35° C. but soluble in water at a temperature of 60° C. or more to obtain a stock liquid in which the second thickening agent is dispersed in the aqueous solution;

dissolving carbon dioxide gas in the stock liquid to obtain a carbonated aqueous solution;

filling a container with the carbonated aqueous solution and sealing the container to obtain the carbonated aqueous solution packed in the container; and heating the carbonated aqueous solution packed in the container such that the carbonated aqueous solution has a temperature of 60° C. or more to dissolve the second thickening agent in the carbonated aqueous solution.

According to a second aspect of the present invention, there is provided a thickened carbonated beverage packed in a container, produced by the above-mentioned method, wherein viscosity A and viscosity B satisfy the following relations:

i) $100 \leq A \leq 300$, and
ii) $B \leq (0.75 \times A)$, where the viscosity A represents a viscosity [mPa·s] of the thickened carbonated beverage when measured by an E-type viscometer under conditions of a temperature of 20° C. and a shear rate of 50/s, and the viscosity B represents a viscosity [mPa·s] of the thickened carbonated beverage when measured by an E-type viscometer under conditions of a temperature of 20° C. and a shear rate of 100/s.

According to the present invention, a method for stably producing a thickened carbonated beverage packed in a container and containing a sufficient amount of carbon dioxide gas, and a thickened carbonated beverage packed in a container which is produced by the method, can be provided.

Further areas of applicability will become apparent from the description provided herein. The description and specific examples in this summary are intended for purposes of illustration only and are not intended to limit the scope of the present disclosure.

DETAILED DESCRIPTION

As described above, a thickened carbonated beverage is difficult to produce, whether it is produced by dissolving a thickening agent in a carbonated beverage after producing the carbonated beverage, or even by dissolving a thickening agent in a beverage in advance and subsequently dissolving carbon dioxide gas in the thickened beverage.

The present inventors found that the production problems would be solved by preparing a thickened carbonated beverage using two kinds of thickening agents, that is, dissolving a first thickening agent in a beverage, dispersing a second thickening agent by the action of the first thickening agent without dissolving the second thickening agent in the beverage, thereby preparing a beverage not having sufficient thickness in advance, then dissolving carbon dioxide gas in the beverage, and finally dissolving the second thickening agent in the beverage by heating, thereby preparing a thickened carbonated beverage having sufficient thickness. Thereby, the present inventors completed the present invention.

That is, the method of producing a thickened carbonated beverage packed in a container, of the present invention, includes:

mixing an aqueous solution containing a first thickening agent and having a temperature of 0 to 35° C. with a second thickening agent which is insoluble in water in a temperature range of 0 to 35° C. but soluble in water at a temperature of 60° C. or more to obtain a stock liquid in which the second thickening agent is dispersed in the aqueous solution;

dissolving carbon dioxide gas in the stock liquid to obtain a carbonated aqueous solution;

filling a container with the carbonated aqueous solution and sealing the container to obtain the carbonated aqueous solution packed in the container; and heating the carbonated aqueous solution packed in the container such that the carbonated aqueous solution has a temperature of 60° C. or more to dissolve the second thickening agent in the carbonated aqueous solution.

In the present specification, the "carbonated beverage" refers to a beverage containing carbon dioxide gas. In the present specification, the "beverage" refers to any liquid for drinking, and includes, for example, soft drinks, fruit beverages, milk beverages, and alcoholic beverages. The amount of carbon dioxide gas dissolved in the beverage is not particularly limited, and may be the same as the amount of carbon dioxide gas contained in a general carbonated beverage. A gas volume of carbon dioxide gas is about 1 to 2 for a general carbonated beverage, and about 3 for a carbonated beverage containing a large amount of carbon dioxide gas, such as cola. In the present specification, the gas volume is a value of the amount (volume) of gas contained with respect to the amount (volume) of the beverage at a temperature of 20° C.

In the present specification, the "thickened carbonated beverage" refers to a carbonated beverage having viscosity such that the carbonated beverage contained in a container flows out of the container when the container is tilted. The "thickened carbonated beverage" refers to a carbonated beverage having a viscosity of, for example, 50 to 300 [mPa·s]. In the present specification, the viscosity refers to a value measured by an E-type viscometer according to JIS Z8803: 2011 under the conditions of a temperature of 20° C. and a shear rate of 50/s unless special measurement conditions are described.

Hereinafter, the method of the present invention will be described in the order of the steps of the method. The description provided hereinafter is intended to explain the invention in detail, and is not intended to limit the invention.

<Preparation of Stock Liquid>

A stock liquid can be prepared by dissolving the first thickening agent in water having a temperature of 0 to 35° C. to prepare an aqueous solution containing the first thickening agent, and then mixing the aqueous solution containing the first thickening agent with the second thickening agent which is insoluble in water in the temperature range of 0 to 35° C. but soluble in water at a temperature of 60° C. or more.

Any thickening agent may be used as the first thickening agent without limitation as long as it is a thickening agent soluble in water having a temperature within the range of 0 to 35° C. Examples of the first thickening agent include welan gum, guar gum, cold-water-soluble type of iota carrageenan, lambda carrageenan, xanthan gum, cold-water-soluble type of tamarind seed gum, tara gum, and psyllium seed gum.

As the first thickening agent, a thickening agent that is soluble in water having a temperature within the range of 0 to 35° C. and that exhibits pseudoplasticity when dissolved in water is preferably used. Examples of such a first thickening agent include welan gum, guar gum, cold-water-soluble type of iota carrageenan, lambda carrageenan, xanthan gum, tara gum, and psyllium seed gum. The first thickening agent may be used in one type or in combination of a plurality of types.

Pseudoplasticity refers to the property by which an aqueous solution containing a thickening agent shows high viscosity when low shearing force is applied to the aqueous solution, and the viscosity of the aqueous solution decreases (i.e., flowability of the aqueous solution increases) when high shearing force is applied to it. Namely, the pseudoplasticity refers to the nature of a fluid that is easily swallowed by a person with a swallowing disorder.

The first thickening agent is added to water having a temperature of 0 to 35° C., in such an amount that the aqueous solution containing the first thickening agent has the desired viscosity. Specifically, the first thickening agent may be added in such an amount that the aqueous solution containing the first thickening agent has a viscosity of, for example, 20 to 150 [mPa·s], preferably 20 to 100 [mPa·s], more preferably 20 to 75 [mPa·s]. For example, when welan gum is used as the first thickening agent, 0.1 to 1.0 part by mass of welan gum can be added with respect to 100 parts by mass of water.

The temperature of water for dissolving the first thickening agent is 0 to 35° C., and is a temperature equal to or higher than the temperature at which the first thickening agent can dissolve. The temperature of water for dissolving the first thickening agent is preferably 15 to 35° C. in view of the dissolution efficiency of the first thickening agent.

The aqueous solution containing the first thickening agent can be prepared by adding the first thickening agent to water having a temperature of 0 to 35° C. in such an amount that an aqueous solution having the above-described viscosity can be obtained, and stirring it as necessary.

The aqueous solution containing the first thickening agent thus prepared has a viscosity of, for example, 20 to 150 [mPa·s], preferably 20 to 100 [mPa·s], more preferably 20 to 75 [mPa·s]. If the viscosity of the aqueous solution containing the first thickening agent is too low, it is difficult to disperse the second thickening agent in the aqueous solution containing the first thickening agent and maintain the dispersed state in the subsequent step. If the viscosity of the aqueous solution containing the first thickening agent is too high, it is difficult to dissolve a sufficient amount of carbon dioxide gas in the stock liquid in the subsequent step. Also, if the viscosity of the aqueous solution containing the first thickening agent is too high, the carbonated aqueous solution tends to spill out of the container in the subsequent step of filling the container.

Next, the resultant aqueous solution containing the first thickening agent is mixed with the second thickening agent which is insoluble in water in a temperature range of 0 to 35° C. but soluble in water at a temperature of 60° C. or more, thereby preparing the stock liquid.

Any thickening agent may be used as the second thickening agent without limitation as long as it is insoluble in water in the entire temperature range of 0 to 35° C. but soluble in water at a temperature of 60° C. or more. Examples of the second thickening agent include locust bean gum, heat-soluble type of iota carrageenan, native gellan gum, low-methoxyl pectin, and heat-soluble type of tamarind seed gum.

Preferably, as the second thickening agent, a thickening agent that is insoluble in water in the entire temperature range of 0 to 35° C. but soluble in water at a temperature of 60° C. or more, and that exhibits Newtonian viscosity when dissolved in water can be used. Examples of such a second thickening agent include locust bean gum, heat-soluble type of iota carrageenan, native gellan gum, low-methoxyl pectin, and heat-soluble type of tamarind seed gum. The Newtonian viscosity means the property by which the viscosity of an aqueous solution containing a thickening agent does not substantially change even if the shearing force applied to the aqueous solution containing a thickening agent is altered. The second thickening agent may be used in one type or in combination of a plurality of types.

Iota carrageenan as an example of the first thickening agent and the second thickening agent is known to have a cold-water-soluble type and a heat-soluble type, depending on the difference of the constituent or the production method thereof. The cold-water-soluble type of iota carrageenan is literally iota carrageenan that can be dissolved in cold water (for example, having a temperature of 0 to 35° C.), and the heat-soluble type of iota carrageenan is iota carrageenan that requires heating at a temperature of 60° C. or more to dissolve. Both are commercially available.

Likewise, tamarind seed gum as an example of the first thickening agent and the second thickening agent is known to have a cold-water-soluble type and a heat-soluble type, depending on the difference of the constituent or the production method thereof. The cold-water-soluble type of tamarind seed gum is literally tamarind seed gum that can be dissolved in cold water (for example, having a temperature of 0 to 35° C.), and the heat-soluble type of tamarind seed gum is tamarind seed gum that requires heating at a temperature of 60° C. or more to dissolve. Both are commercially available.

Native gellan gum as an example of the second thickening agent is gellan gum produced by microorganisms. Gellan gum is known to have native gellan gum and deacylated gellan gum. Native gellan gum does not include a deacylation step in its production process, and thus contains an acyl group. Commercially available native gellan gum can be used.

Low-methoxyl pectin as an example of the second thickening agent refers to pectin having an esterification degree of less than 50%, and a commercially available one can be used.

The second thickening agent can be added to the aqueous solution containing the first thickening agent, in such an amount that a thickened carbonated beverage packed in a container as a finished product has a viscosity of, for example, 50 to 300 [mPa·s], preferably 100 to 150 [mPa·s].

For example, when welan gum is used as the first thickening agent and locust bean gum is used as the second thickening agent, 0.1 to 1.0 part by mass of welan gum and 0.2 to 0.8 part by mass of locust bean gum can be added with respect to 100 parts by mass of water. If the amount of welan gum added is small within the aforementioned range, the amount of locust bean gum added is increased within the aforementioned range because locust bean gum is added so that the thickened carbonated beverage packed in a container as a finished product has a viscosity of, for example, 50 to 300 [mPa·s], preferably 100 to 150 [mPa·s]. On the other hand, if the amount of welan gum added is large within the aforementioned range, the amount of locust bean gum added is decreased within the aforementioned range because locust bean gum is added so that the thickened carbonated beverage packed in a container as a finished product has a viscosity of, for example, 50 to 300 [mPa·s], preferably 100 to 150 [mPa·s].

The stock liquid can be prepared by adding the second thickening agent to the aqueous solution containing the first thickening agent, and stirring it. The second thickening agent is dispersed in the resultant stock liquid, without being dissolved in the aqueous solution containing the first thickening agent. Since the stock liquid has viscosity due to the action of the first thickening agent, the second thickening agent can maintain its dispersed state without precipitating. In this stage, the second thickening agent is dispersed and does not contribute to the viscosity of the stock liquid. However, the second thickening agent is ultimately dissolved through heating, and thereby provides, together with the first thickening agent, desired viscosity to the carbonated beverage.

In order to provide a desired taste and flavor to the thickened carbonated beverage packed in a container as a finished product, the stock liquid may further contain an additive. The additive may be, for example, a sweetener, an acidulant, a fruit juice, a vegetable juice, a flavor, a pigment, a pH-adjusting agent, sugar, sugar alcohol, dietary fiber, extract such as tea or coffee, alcohol, or a combination thereof.

The additive may be added directly to "a dispersion liquid in which the second thickening agent is dispersed in the aqueous solution containing the first thickening agent." Alternatively, the additive is dissolved in water in another tank in advance to prepare an aqueous solution containing the additive, and the prepared aqueous solution may be added to the aforementioned dispersion liquid.

The stock liquid prepared has a pH of, for example, 3.5 to 4.6, preferably a pH of 3.5 or more and less than 4.6, more preferably a pH of 4.0 or more and less than 4.6. When the stock liquid has a pH of 3.5 to 4.6, the thickened carbonated beverage packed in a container as a finished product has excellent viscosity stability after storage.

The viscosity of the stock liquid is, for example, 20 to 150 [mPa·s], preferably 20 to 100 [mPa·s], more preferably 20 to 75 [mPa·s]. If the viscosity of the stock liquid is too low, the second thickening agent may precipitate in the stock liquid. If the viscosity of the stock liquid is too high, it tends to be difficult to dissolve carbon dioxide gas in the stock liquid. Also, if the viscosity of the stock liquid is too high, the carbonated aqueous solution tends to spill out of the container in the subsequent step of filling the container.

Over the entire period of the preparation step of the stock liquid, the liquids containing the second thickening agent (i.e., the aqueous solution containing the first thickening agent in the middle of the step of adding the second thickening agent, and the stock liquid) need to be maintained at a temperature at which the second thickening agent does not dissolve, for example, at a temperature of less than 60° C., preferably 0° C. or more and less than 60° C., more preferably 0 to 35° C., still more preferably 15 to 35° C.

<Preparation of Carbonated Aqueous Solution>

Carbon dioxide gas is dissolved in the stock liquid obtained as described above, thereby preparing a carbonated aqueous solution.

For example, a carbonator, which is an apparatus for producing a carbonated beverage, can be used to dissolve carbon dioxide gas.

Over the entire period of the step of dissolving carbon dioxide gas in the stock liquid, the liquids (i.e., the stock liquid, the stock liquid in the middle of the step of dissolving carbon dioxide, and the carbonated aqueous solution) need to be maintained at a temperature at which the second thickening agent does not dissolve, for example, at a temperature of less than 60° C., preferably 0° C. or more and less than 60° C., more preferably 0 to 35° C., still more preferably 0 to 10° C. If the liquids are maintained at low temperature over the entire period of this step, the dissolved carbon dioxide gas is less likely to escape from the liquids.

In view of the dissolution efficiency of carbon dioxide gas, it is preferable to cool the stock liquid to a temperature of 5° C. or less, preferably to a temperature of 0 to 5° C., over the period of dissolving carbon dioxide gas in the stock liquid.

The amount of carbon dioxide gas dissolved in the stock liquid can be the same as the amount of carbon dioxide gas contained in a typical carbonated beverage. The amount of carbon dioxide gas dissolved in the stock liquid can be set so that the gas volume of the carbonated aqueous solution is, for example, 1 to 3, preferably 1.2 to 2.0.

<Preparation of Carbonated Aqueous Solution Packed in Container>

A container is filled with the resultant carbonated aqueous solution and is sealed, thereby preparing the carbonated aqueous solution packed in the container. For example, the container may be filled with the carbonated aqueous solution using a beverage filling machine (filler), and sealed.

Any container may be used without limitation as long as it has heat resistance and sealability and can withstand the internal pressure of the carbonated beverage, and a general container for carbonated beverages may be used. Specifically, steel cans, aluminum cans, or plastic bottles can be used.

Sealing of the container can be performed by a general method of sealing beverage containers. For example, when the container is a can, a contact portion between the can lid and the can barrel may be seamed and sealed. When the container is a plastic bottle, a cap may be attached to the spout of the container body to thereby seal the container.

Over the entire period of the step of filling the container with the carbonated aqueous solution and sealing the container, the liquid (i.e., the carbonated aqueous solution) needs to be maintained at a temperature at which the second thickening agent does not dissolve, for example, at a temperature of less than 60° C., preferably 0° C. or more and less than 60° C., more preferably 0 to 35° C., still more preferably 0 to 10° C. If the liquid is maintained at low temperature over the entire period of this step, the dissolved carbon dioxide gas is less likely to escape from the liquid.

The resultant carbonated aqueous solution packed in the container has low viscosity because the second thickening agent is not dissolved therein. Since the viscosity of the carbonated aqueous solution packed in the container is low, the gas volume (i.e., content of carbon dioxide gas) of the carbonated aqueous solution can be measured at this stage after sealing. The measurement of the gas volume can be performed using a known apparatus for measuring a gas volume. The measurement of the gas volume is important for quality control of carbonated beverages. However, the thickened carbonated beverage packed in the container as a finished product has higher viscosity than the carbonated aqueous solution packed in the container, thus making it difficult to accurately measure the gas volume. In the present invention, the gas volume is measured at this stage after sealing, so that the gas volume can be accurately measured.

<Heating>

In the heating step, the carbonated aqueous solution packed in the container is heated such that the carbonated aqueous solution has a temperature of 60° C. or more, thereby dissolving the second thickening agent in the carbonated aqueous solution.

Heating can be performed using a device commonly used for heat sterilization of food, such as a retort oven or a shower-type sterilizer.

Heating conditions such as temperature, pressure, and time can be suitably set according to the components of the beverage, the strength of the container, and the like. For example, the carbonated aqueous solution packed in the container can be heated at a temperature of 60 to 120° C. for 0.5 to 40 minutes. More preferably, the carbonated aqueous solution packed in the container can be heated at a temperature of 80 to 110° C. for 1 to 40 minutes. Also, the pressure in heating may be adjusted over time so that the container is not deformed by the internal pressure.

The second thickening agent dispersed in the carbonated aqueous solution is dissolved by heating. Accordingly, the second thickening agent provides viscosity to the carbonated aqueous solution, and ultimately contributes, together with the first thickening agent, to the viscosity of the thickened carbonated beverage. Since the second thickening agent is uniformly dispersed in the carbonated aqueous solution, dissolution of the second thickening agent can uniformly thicken the carbonated aqueous solution. Dissolution of the second thickening agent makes it possible to obtain a thickened carbonated beverage packed in a container and having a sufficient viscosity.

Therefore, in the method of the present invention, the liquids containing the second thickening agent (i.e., the aqueous solution containing the first thickening agent in the middle of the step of adding the second thickening agent, the stock liquid, the stock liquid in the middle of the step of dissolving carbon dioxide gas, and the carbonated aqueous solution) need to be maintained at a temperature at which the second thickening agent does not dissolve, for example, at a temperature of less than 60° C., preferably 0° C. or more and less than 60° C., more preferably 0 to 35° C., in all the steps prior to the heating step (i.e., over the entire period from the step of preparing the stock liquid to the step of sealing the container). More preferably, prior to the step of dissolving carbon dioxide gas in the stock liquid (i.e., in the step of preparing the stock liquid), the liquids containing the second thickening agent may be maintained at a temperature of 15 to 35° C., and during the period from the step of dissolving carbon dioxide gas in the stock liquid to the step of sealing the container, the liquids containing the second thickening agent may be maintained at a temperature of 0 to 10° C.

The thickened carbonated beverage packed in the container obtained according to the method of the present invention has a viscosity of, for example, 50 to 300 [mPa·s], preferably 100 to 150 [mPa·s]. Also, the thickened carbonated beverage packed in the container obtained according to the method of the present invention has a pH of, for example, 3.5 to 4.6, preferably a pH of 3.5 or more and less than 4.6, more preferably a pH of 4.0 or more and less than 4.6. The pH of the thickened carbonated beverage packed in the container produced according to the method of the present invention does not change significantly from the pH of the stock liquid.

The thickened carbonated beverage packed in the container obtained according to the method of the present invention is preferably stored in a refrigerated state at a temperature of 0 to 10° C. from the stage of manufacture to the stage of distribution and sale in order to maintain the quality as a beverage and to stably maintain the viscosity.

<Action Effects>

In the method of the present invention, two types of thickening agents are used, as described above, and the two types of thickening agents have the action effects described below.

Since the first thickening agent is soluble in water having a temperature of 0 to 35° C., it dissolves in the stock liquid and contributes to the viscosity of the stock liquid. By dissolving in the stock liquid, the first thickening agent functions as a dispersing aid for dispersing the second thickening agent. Since the second thickening agent is insoluble in water in a temperature range of 0 to 35° C. but soluble in water at a temperature of 60° C. or more, it does not dissolve in the stock liquid and does not contribute to the viscosity of the stock liquid. By virtue of the function of the first thickening agent as a dispersing aid, the second thickening agent can be dispersed without precipitating in the stock liquid, and thus maintain the dispersed state even after the passage of time. Therefore, the stock liquid is provided with viscosity only by the first thickening agent and has low viscosity. Since the stock liquid has low viscosity, a sufficient amount of carbon dioxide gas can be dissolved in the subsequent step of dissolving carbon dioxide gas. Since the resultant carbonated aqueous solution also has low viscosity, there is no problem that the carbonated aqueous solution spills out of the container in the subsequent step of filling the container. Thereafter, when the carbonated aqueous solution filled in the container is heated, the second thickening agent dissolves in the carbonated aqueous solution and contributes to the viscosity of the carbonated aqueous solution. This makes it possible to stably produce a thickened carbonated beverage packed in a container and having a sufficient amount of carbon dioxide gas and sufficient viscosity.

When the stock liquid is prepared using only the second thickening agent without using the first thickening agent, the second thickening agent precipitates, and the second thickening agent is unevenly distributed in the carbonated aqueous solution upon the dissolution in the final heating step, causing unevenness in the thickness. Also, when the stock liquid is prepared using only the first thickening agent without using the second thickening agent, the viscosity of the stock liquid needs to be kept low in consideration of the subsequent step of dissolving carbon dioxide gas and step of filling the container, and such a stock liquid cannot provide sufficient viscosity to the carbonated aqueous solution.

The method of the present invention also has the following advantage. As described above, while it is difficult to accurately measure the gas volume of the thickened carbonated beverage as a finished product, the method of the present invention allows for accurate measurement of the gas volume because of a low viscosity of the carbonated aqueous solution when the gas volume of the carbonated aqueous solution is measured after filling the container and before heating.

In addition, the method of the present invention has an advantage that conventional facilities for manufacturing carbonated beverages can be used and that no special manufacturing facilities are required.

<Thickened Carbonated Beverage Packed in Container>

In a preferable embodiment, a thickened carbonated beverage packed in a container is as follows:

(I) it is produced by the above-mentioned method, and
(II) viscosity A and viscosity B satisfy the following relations:
  i) $100 \leq A \leq 300$, and
  ii) $B \leq (0.75 \times A)$, where the viscosity A represents a viscosity [mPa·s] of the thickened carbonated beverage when measured by an E-type viscometer under conditions of a temperature of 20° C. and a shear rate of 50/s, and the viscosity B represents a viscosity [mPa·s] of the thickened carbonated beverage when measured by an E-type viscometer under conditions of a temperature of 20° C. and a shear rate of 100/s.

In a more preferable embodiment, a thickened carbonated beverage packed in a container is as follows:

(I) it is produced by the above-mentioned method, and
(II) viscosity A and viscosity B satisfy the following relations:
  i) $100 \leq A \leq 300$, and
  ii) $B \leq (0.73 \times A)$, where the viscosity A represents a viscosity [mPa·s] of the thickened carbonated beverage when measured by an E-type viscometer under conditions of a temperature of 20° C. and a shear rate of 50/s, and the viscosity B represents a viscosity [mPa·s] of the thickened carbonated beverage when measured by an E-type viscometer under conditions of a temperature of 20° C. and a shear rate of 100/s.

In a more preferable embodiment, a thickened carbonated beverage packed in a container is as follows:

(I) it is produced by the above-mentioned method, and
(II) viscosity A and viscosity B satisfy the following relations:
  i) $100 \leq A \leq 300$, and
  ii) $(0.25 \times A) \leq B \leq (0.75 \times A)$, where the viscosity A represents a viscosity [mPa·s] of the thickened carbonated beverage when measured by an E-type viscometer under conditions of a temperature of 20° C. and a shear rate of 50/s, and the viscosity B represents a viscosity [mPa·s] of the thickened carbonated beverage when measured by an E-type viscometer under conditions of a temperature of 20° C. and a shear rate of 100/s.

In a more preferable embodiment, a thickened carbonated beverage packed in a container is as follows:

(I) it is produced by the above-mentioned method, and
(II) viscosity A and viscosity B satisfy the following relations:
  i) $100 \leq A \leq 300$, and
  ii) $(0.27 \times A) \leq B \leq (0.73 \times A)$, where the viscosity A represents a viscosity [mPa·s] of the thickened carbonated beverage when measured by an E-type viscometer under conditions of a temperature of 20° C. and a shear rate of 50/s, and the viscosity B represents a viscosity [mPa·s] of the thickened carbonated beverage when measured by an E-type viscometer under conditions of a temperature of 20° C. and a shear rate of 100/s.

A shear rate of 50/s is a measurement condition generally recommended when measuring the viscosity of food for a person having difficulty in swallowing. Also, a shear rate of 100/s is a measurement condition corresponding to the shear rate of the flow of a fluid in the throat during swallowing.

When the thickened carbonated beverage packed in a container has a viscosity specified by the relation i) $100 \leq A \leq 300$, the beverage is good in cohesiveness when taken into the mouth and is less likely to cause aspiration.

Also, the thickened carbonated beverage packed in a container satisfying the relation ii) $B \leq (0.75 \times A)$, preferably the relation ii) $B \leq (0.73 \times A)$ indicates that the viscosity of the beverage when swallowed is lower than the viscosity of the beverage when taken into the mouth, and that the difference between these viscosities is at least a certain degree (i.e., indicates high pseudoplasticity). With this physical property, the beverage is easy to swallow, and the stickiness of the beverage when swallowed is reduced. The relation ii) is preferably $(0.25 \times A) \leq B \leq (0.75 \times A)$, more preferably $(0.27 \times A) \leq B \leq (0.73 \times A)$.

The viscosity A and the viscosity B of the thickened carbonated beverage can be adjusted, for example, by using the first thickening agent having pseudoplasticity when dissolved in water, and the second thickening agent having Newtonian viscosity when dissolved in water, and changing the mixing ratio of these thickening agents. Adjusting the viscosity A and the viscosity B of the thickened carbonated beverage so as to satisfy the relations i) and ii) allows the thickened carbonated beverage to exhibit pseudoplasticity. When the first thickening agent having pseudoplasticity and the second thickening agent having Newtonian viscosity are used, increasing the mixing ratio of the first thickening agent to the second thickening agent can increase the pseudoplasticity exhibited in the beverage. That is, increasing the mixing ratio of the first thickening agent to the second thickening agent can increase the difference between the viscosity A and the viscosity B.

The above-described thickened carbonated beverage packed in the container has a pH of, for example, 3.5 to 4.6, preferably a pH of 3.5 or more and less than 4.6, more preferably a pH of 4.0 or more and less than 4.6, as described above.

From the foregoing, the above-described thickened carbonated beverage packed in the container can deliver a refreshing feeling as a carbonated beverage, and is easy for a person with a swallowing disorder to drink as it satisfies the relations i) and ii). That is, when a person having difficulty in swallowing begins to drink the beverage and carry the beverage in his or her mouth, the beverage can be swallowed in a good cohesive state with relatively high viscosity, preventing choking and aspiration. In addition, when a person having difficulty in swallowing swallows the beverage, the shear stress acts to lower the viscosity, allowing the beverage to easily pass through the throat.

PREFERABLE EMBODIMENTS

Preferable embodiments of the present invention are described below.

As described above, there is provided a method of producing a thickened carbonated beverage packed in a container, the method comprising:

mixing an aqueous solution containing a first thickening agent and having a temperature of 0 to 35° C. with a second thickening agent which is insoluble in water in a temperature range of 0 to 35° C. but soluble in water at a temperature of 60° C. or more to obtain a stock liquid in which the second thickening agent is dispersed in the aqueous solution;

dissolving carbon dioxide gas in the stock liquid to obtain a carbonated aqueous solution;

filling a container with the carbonated aqueous solution and sealing the container to obtain the carbonated aqueous solution packed in the container; and heating the carbonated aqueous solution packed in the container such that the carbonated aqueous solution has a temperature of 60° C. or more to dissolve the second thickening agent in the carbonated aqueous solution.

According to a preferable embodiment, in the above-described embodiment, the first thickening agent is at least one selected from the group consisting of welan gum, guar gum, cold-water-soluble type of iota carrageenan, lambda carrageenan, xanthan gum, cold-water-soluble type of tamarind seed gum, tara gum, and psyllium seed gum; and the second thickening agent is at least one selected from the group consisting of locust bean gum, heat-soluble type of iota carrageenan, native gellan gum, low-methoxyl pectin, and heat-soluble type of tamarind seed gum.

According to a more preferable embodiment, in any one of the above-described embodiments, the first thickening agent is at least one selected from the group consisting of welan gum, guar gum, cold-water-soluble type of iota carrageenan, lambda carrageenan, xanthan gum, tara gum, and psyllium seed gum; and the second thickening agent is at least one selected from the group consisting of locust bean gum, heat-soluble type of iota carrageenan, native gellan gum, low-methoxyl pectin, and heat-soluble type of tamarind seed gum.

According to a more preferable embodiment, in any one of the above-described embodiments, the first thickening agent is welan gum, and the second thickening agent is locust bean gum.

According to a more preferable embodiment, in any one of the above-described embodiments, the aqueous solution containing the first thickening agent has a viscosity of 20 to 150 [mPa·s], preferably 20 to 100 [mPa·s], more preferably 20 to 75 [mPa·s], when measured by an E-type viscometer under conditions of a temperature of 20° C. and a shear rate of 50/s.

According to a more preferable embodiment, in any one of the above-described embodiments, the aqueous solution containing the first thickening agent has a temperature of 15 to 35° C.

According to a more preferable embodiment, in any one of the above-described embodiments, the second thickening agent is mixed with the aqueous solution containing the first thickening agent, in such an amount that the thickened carbonated beverage packed in a container and having a viscosity of 50 to 300 [mPa·s], preferably 100 to 150 [mPa·s], is obtained.

According to a more preferable embodiment, in any one of the above-described embodiments, the stock liquid further includes an additive.

According to a more preferable embodiment, in any one of the above-described embodiments, the stock liquid prepared has a pH of 3.5 to 4.6, preferably a pH of 3.5 or more and less than 4.6, more preferably a pH of 4.0 or more and less than 4.6.

According to a more preferable embodiment, in any one of the above-described embodiments, the stock liquid has a viscosity of 20 to 150 [mPa·s], preferably 20 to 100 [mPa·s], more preferably 20 to 75 [mPa·s].

According to a more preferable embodiment, in any one of the above-described embodiments, the liquids containing the second thickening agent (i.e., the aqueous solution containing the first thickening agent in the middle of the step of adding the second thickening agent, and the stock liquid) are maintained at a temperature at which the second thickening agent does not dissolve, for example, at a temperature of less than 60° C., preferably 0° C. or more and less than 60° C., more preferably 0 to 35° C., still more preferably 15 to 35° C., over the entire period of the preparation step of the stock liquid.

According to a more preferable embodiment, in any one of the above-described embodiments, the dissolving the carbon dioxide gas in the stock liquid is performed cooling the stock liquid to a temperature of 5° C. or less, preferably to a temperature of 0 to 5° C.

According to a more preferable embodiment, in any one of the above-described embodiments, the carbon dioxide gas is dissolved in the stock liquid in such an amount that the carbonated aqueous solution having a gas volume of 1 to 3, preferably 1.2 to 2.0, is obtained.

According to a more preferable embodiment, in any one of the above-described embodiments, the liquids (i.e., the stock liquid, the stock liquid in the middle of the step of dissolving carbon dioxide, and the carbonated aqueous solution) is maintained at a temperature at which the second thickening agent does not dissolve, for example, at a temperature of less than 60° C., preferably 0° C. or more and less than 60° C., more preferably 0 to 35° C., still more preferably 0 to 10° C., over the entire period of the step of dissolving carbon dioxide gas in the stock liquid.

According to a more preferable embodiment, in any one of the above-described embodiments, the container is a steel can, an aluminum can, or a plastic bottle.

According to a more preferable embodiment, in any one of the above-described embodiments, the liquid (i.e., the carbonated aqueous solution) is maintained at a temperature at which the second thickening agent does not dissolve, for example, at a temperature of less than 60° C., preferably 0° C. or more and less than 60° C., more preferably 0 to 35° C., still more preferably 0 to 10° C., over the entire period of the step of filling the container with the carbonated aqueous solution and sealing the container.

According to a more preferable embodiment, in any one of the above-described embodiments, the heating is performed by heating the carbonated aqueous solution packed in the container for 0.5 to 40 minutes such that the carbonated aqueous solution has a temperature of 60 to 120° C.

According to a more preferable embodiment, in any one of the above-described embodiments, the heating is performed by heating the carbonated aqueous solution packed in the container for 1 to 40 minutes such that the carbonated aqueous solution has a temperature of 80 to 110° C.

According to a more preferable embodiment, in any one of the above-described embodiments, all the liquids containing the second thickening agent (i.e., the aqueous solution containing the first thickening agent in the middle of the step of adding the second thickening agent, the stock liquid, the stock liquid in the middle of the step of dissolving carbon dioxide gas, and the carbonated aqueous solution) are maintained at a temperature at which the second thickening agent does not dissolve, for example, at a temperature of less than 60° C., preferably 0° C. or more and less than 60° C., more preferably 0 to 35° C., in all the steps prior to the heating step (i.e., over the entire period from the step of preparing the stock liquid to the step of sealing the container).

According to a more preferable embodiment, in any one of the above-described embodiments, the liquids containing the second thickening agent is maintained at a temperature of 15 to 35° C. prior to the step of dissolving carbon dioxide gas in the stock liquid (i.e., in the step of preparing the stock liquid), and the liquids containing the second thickening agent is maintained at a temperature of 0 to 10° C. during the period from the step of dissolving carbon dioxide gas in the stock liquid to the step of sealing the container.

According to a more preferable embodiment, in any one of the above-described embodiments, the thickened carbonated beverage packed in the container has a viscosity of 50 to 300 [mPa·s], preferably 100 to 150 [mPa·s].

According to a more preferable embodiment, in any one of the above-described embodiments, the thickened carbonated beverage packed in the container has a pH of 3.5 to 4.6, preferably a pH of 3.5 or more and less than 4.6, more preferably a pH of 4.0 or more and less than 4.6.

According to another embodiment, there is provided a thickened carbonated beverage packed in a container, produced by the method according to any one of the above-described embodiments, wherein viscosity A and viscosity B satisfy the following relations:
  i) $100 \leq A \leq 300$, and
  ii) $B \leq (0.75 \times A)$,
where the viscosity A represents a viscosity [mPa·s] of the thickened carbonated beverage when measured by an E-type viscometer under conditions of a temperature of 20° C. and a shear rate of 50/s, and the viscosity B represents a viscosity [mPa·s] of the thickened carbonated beverage when measured by an E-type viscometer under conditions of a temperature of 20° C. and a shear rate of 100/s.

According to a preferable embodiment, in the above-described embodiment, the viscosity A and the viscosity B satisfy the following relations:
  i) $100 \leq A \leq 300$, and
  ii) $B \leq (0.73 \times A)$.

According to a more preferable embodiment, in any one of the above-described embodiments, the viscosity A and the viscosity B satisfy the following relations:
  i) $100 \leq A \leq 300$, and
  ii) $(0.25 \times A) \leq B \leq (0.75 \times A)$.

According to a more preferable embodiment, in any one of the above-described embodiments, the viscosity A and the viscosity B satisfy the following relations:
  i) $100 \leq A \leq 300$, and
  ii) $(0.27 \times A) \leq B \leq (0.73 \times A)$.

According to a more preferable embodiment, in any one of the above-described embodiments, the thickened carbonated beverage packed in a container has a pH of 3.5 to 4.6, preferably a pH of 3.5 or more and less than 4.6, more preferably a pH of 4.0 or more and less than 4.6.

EXAMPLES

Example 1

1-1. Preparation of Thickened Carbonated Beverage Packed in Container

Beverages 1 to 10 having the viscosity shown in Table 1 below were prepared using welan gum as the first thickening agent and locust bean gum as the second thickening agent. An aqueous solution containing welan gum shows very high pseudoplasticity, and an aqueous solution containing locust bean gum shows Newtonian viscosity.

Also, a comparative beverage 1 having the viscosity shown in Table 1 below was prepared using only tamarind seed gum as a thickening agent. An aqueous solution containing tamarind seed gum shows Newtonian viscosity.

TABLE 1

|  | Viscosity | | Percentage [%] of people who said the beverage was easy to swallow | Ease of swallowing | Percentage [%] of people who said the beverage was sticky | Stickiness |
| --- | --- | --- | --- | --- | --- | --- |
|  | A [mPa · s] (at shear rate of 50/s) | B [mPa · s] (at shear rate of 100/s) |  |  |  |  |
| Beverage 1 | 150 | 130 | 30 | Δ | 100 | Δ |
| Beverage 2 | 150 | 120 | 40 | Δ | 80 | Δ |
| Beverage 3 | 150 | 110 | 70 | ○ | 60 | ○ |

TABLE 1-continued

|  | Viscosity | | Percentage [%] of people who said the beverage was easy to swallow | Ease of swallowing | Percentage [%] of people who said the beverage was sticky | Stickiness |
| --- | --- | --- | --- | --- | --- | --- |
|  | A [mPa·s] (at shear rate of 50/s) | B [mPa·s] (at shear rate of 100/s) |  |  |  |  |
| Beverage 4 | 150 | 100 | 80 | ○ | 50 | ○ |
| Beverage 5 | 150 | 90 | 90 | ○ | 40 | ○ |
| Beverage 6 | 150 | 80 | 90 | ○ | 40 | ○ |
| Beverage 7 | 150 | 70 | 100 | ○ | 30 | ○ |
| Beverage 8 | 150 | 60 | 100 | ○ | 30 | ○ |
| Beverage 9 | 150 | 50 | 100 | ○ | 0 | ○ |
| Beverage 10 | 150 | 40 | 100 | ○ | 0 | ○ |
| Comparative beverage 1 | 150 | 150 | 10 | Δ | 100 | Δ |

In Table 1, a viscosity as measured using an E-type viscometer (Viscometer TV-25 type L manufactured by Toki Sangyo Co., Ltd.) under conditions of a temperature of 20° C. and a shear rate of 50/s is represented by A [mPa·s], and a viscosity as measured using the E-type viscometer under conditions of a temperature of 20° C. and a shear rate of 100/s is represented by B [mPa·s].

The viscosity A and the viscosity B of the beverages 1 to 10 were adjusted by changing the blending amounts of the first thickening agent and the second thickening agent.

[Beverage 1]
[Composition]
Water: 100 parts by mass
Welan gum (VIS TOP W; San-Ei Gen F.F.I., Inc.): 0.15 part by mass
Locust bean gum (GENU GUM type RL-200-J; Sansho Co., Ltd.): 0.55 part by mass
pH-Adjusting agent (citric acid): Added so that the pH of the stock liquid became 4.0

[Procedure]
First, welan gum was added to water having a temperature of 20° C. and stirred to prepare an aqueous solution containing welan gum. The aqueous solution containing welan gum had a viscosity of 40 [mPa·s]. Locust bean gum was added to the aqueous solution containing welan gum and stirred to prepare a dispersion liquid of locust bean gum. The pH-adjusting agent was added to the resultant dispersion liquid of locust bean gum, so that the pH of the dispersion liquid was adjusted to 4.0. Through this procedure, a stock liquid was prepared. The stock liquid had a viscosity of 80 [mPa·s].

The stock liquid was sent to a cooling plate and cooled to a temperature of 0° C. Carbon dioxide gas was dissolved in the cooled stock liquid using a carbonator, to prepare a carbonated aqueous solution. The carbon dioxide gas was dissolved so that the gas volume of the carbonated aqueous solution was 2.0.

A container (NBC 300; Daiwa Can Company) was filled with the resultant carbonated aqueous solution, using a filler, and was sealed to prepare a carbonated aqueous solution packed in the container.

The resultant carbonated aqueous solution packed in the container was heated at a temperature of 95° C. for 30 minutes using a shower-type sterilizer, to perform heat sterilization. As a result of the heating, the temperature of the carbonated aqueous solution in the container also reached 95° C. Thereby, locust bean gum was dissolved in the carbonated aqueous solution to prepare a thickened carbonated aqueous solution in the container. The thickened carbonated aqueous solution was cooled down to room temperature (20° C.), thereby completing the production of a thickened carbonated beverage packed in the container (beverage 1).

[Beverage 2]
A thickened carbonated beverage packed in a container was prepared according to the same composition and procedure as the beverage 1, except that the blending amount of welan gum was 0.20 part by mass and the blending amount of locust bean gum was 0.50 part by mass.

[Beverage 3]
A thickened carbonated beverage packed in a container was prepared according to the same composition and procedure as the beverage 1, except that the blending amount of welan gum was 0.25 part by mass and the blending amount of locust bean gum was 0.45 part by mass.

[Beverage 4]
A thickened carbonated beverage packed in a container was prepared according to the same composition and procedure as the beverage 1, except that the blending amount of welan gum was 0.30 part by mass and the blending amount of locust bean gum was 0.40 part by mass.

[Beverage 5]
A thickened carbonated beverage packed in a container was prepared according to the same composition and procedure as the beverage 1, except that the blending amount of welan gum was 0.35 part by mass and the blending amount of locust bean gum was 0.35 part by mass.

[Beverage 6]
A thickened carbonated beverage packed in a container was prepared according to the same composition and procedure as the beverage 1, except that the blending amount of welan gum was 0.40 part by mass and the blending amount of locust bean gum was 0.30 part by mass.

[Beverage 7]
A thickened carbonated beverage packed in a container was prepared according to the same composition and procedure as the beverage 1, except that the blending amount of welan gum was 0.45 part by mass and the blending amount of locust bean gum was 0.25 part by mass.

[Beverage 8]
A thickened carbonated beverage packed in a container was prepared according to the same composition and procedure as the beverage 1, except that the blending amount of welan gum was 0.50 part by mass and the blending amount of locust bean gum was 0.20 part by mass.

[Beverage 9]

A thickened carbonated beverage packed in a container was prepared according to the same composition and procedure as the beverage 1, except that the blending amount of welan gum was 0.55 part by mass and the blending amount of locust bean gum was 0.15 part by mass.

[Beverage 10]

A thickened carbonated beverage packed in a container was prepared according to the same composition and procedure as the beverage 1, except that the blending amount of welan gum was 0.60 part by mass and the blending amount of locust bean gum was 0.10 part by mass.

In all the beverages 1 to 10, the viscosities of the stock liquids were sufficiently low. Therefore, a sufficient amount of carbon dioxide gas could be dissolved in the stock liquids in the subsequent step of dissolving carbon dioxide gas, and the carbonated aqueous solution did not spill out of the container in the subsequent step of filling the container. As described above, according to the method of the present invention, it is possible to stably produce a thickened carbonated beverage packed in a container with a sufficient amount of carbon dioxide gas contained in the beverage.

[Comparative Beverage 1]

[Composition]

Water: 100 parts by mass

Cold-water-soluble type tamarind seed gum (GLYLOID 3S; DSP Gokyo Food & Chemical Co., Ltd.): 0.7 part by mass pH-Adjusting agent (citric acid): Added so that the pH of the stock liquid became 4.0

[Procedure]

First, tamarind seed gum was added to water having a temperature of 20° C. and stirred to prepare an aqueous solution containing tamarind seed gum. The pH-adjusting agent was added to the aqueous solution containing tamarind seed gum, so that the pH of the solution was adjusted to 4.0. Through this procedure, a stock liquid was prepared. The stock liquid had a viscosity of 150 [mPa·s].

The stock liquid was sent to a cooling plate and cooled to a temperature of 0° C. Carbon dioxide gas was dissolved in the cooled stock liquid using a carbonator, to prepare a carbonated aqueous solution. The carbon dioxide gas was dissolved so that the gas volume of the carbonated aqueous solution was 2.0.

A container (NBC 300; Daiwa Can Company) was filled with the resultant carbonated aqueous solution, using a filler, and was sealed to prepare a carbonated aqueous solution packed in the container.

The resultant carbonated aqueous solution packed in the container was heated at a temperature of 95° C. for 30 minutes using a shower-type sterilizer, to perform heat sterilization. Thereafter, the carbonated aqueous solution packed in the container was cooled down to room temperature (20° C.), thereby completing a thickened carbonated beverage packed in the container (comparative beverage 1).

Since the thickening agent soluble in cold water was used, the viscosity increased before dissolving carbon dioxide gas, causing the carbonated aqueous solution to spill out of the container in the subsequent filling step.

1-2. Sensory Evaluation

A sensory evaluation was performed on the beverages 1 to 10 and the comparative beverage 1. The sensory evaluation was performed by a panel of 10 healthy people. In the sensory evaluation, ease of swallowing and stickiness were evaluated. The evaluation method and evaluation criteria are as described below.

<Ease of Swallowing>

Each member of the panel judged whether each beverage was easy to swallow or not.

◦: 50% or more of the panel felt that the beverage was easy to swallow.

Δ: Less than 50% of the panel felt that the beverage was easy to swallow.

<Stickiness>

Each member of the panel judged whether each beverage was "sticky" or not when swallowed, and the percentage of the people who felt the beverage to be "sticky" was calculated.

◦: 50% or less of the panel felt the beverage to be "sticky."

Δ: More than 50% of the panel felt the beverage to be "sticky."

When the evaluation result of the ease of swallowing was ◦, and the evaluation result of the stickiness was ◦, the swallowability was evaluated as very good.

1-3. Evaluation Results

The results of the sensory evaluation are shown in Table 1 above.

In regard to the beverages 3 to 10, the value of "viscosity B/viscosity A" was ≤ about 0.73, and the ease of swallowing was good. On the other hand, the viscosity A and the viscosity B of the comparative beverage 1 were the same even though the shear rates were different, and it was not felt that the beverage was easy to swallow.

In regard to the beverages 3 to 10, the difference between the viscosity B measured at a shear rate of 100/s and the viscosity A measured at a shear rate of 50/s was larger than that of the beverages 1 and 2, and the beverages 3 to 10 were easy to swallow and not sticky when swallowed. Thus, the swallowability was very good.

Example 2

In Example 1, the beverages whose viscosity A measured at a shear rate of 50/s was 150 [mPa·s] were described as examples. In Example 2, beverages whose viscosity A measured at a shear rate of 50/s was 100 [mPa·s] will be described as examples.

2-1. Preparation of Thickened Carbonated Beverage Packed in Container

Beverages 11 to 16 having the viscosity shown in Table 2 below were prepared using welan gum as the first thickening agent and locust bean gum as the second thickening agent. Also, a comparative beverage 2 having the viscosity shown in Table 2 below was prepared using only cold-water-soluble tamarind seed gum as a thickening agent.

TABLE 2

|  | Viscosity | | Percentage [%] of people who said the beverage was easy to swallow | Ease of swallowing | Percentage [%] of people who said the beverage was sticky | Stickiness |
| --- | --- | --- | --- | --- | --- | --- |
|  | A [mPa·s] (at shear rate of 50/s) | B [mPa·s] (at shear rate of 100/s) |  |  |  |  |
| Beverage 11 | 100 | 80 | 40 | Δ | 70 | Δ |
| Beverage 12 | 100 | 70 | 80 | ○ | 40 | ○ |
| Beverage 13 | 100 | 60 | 90 | ○ | 30 | ○ |
| Beverage 14 | 100 | 50 | 100 | ○ | 10 | ○ |
| Beverage 15 | 100 | 40 | 100 | ○ | 10 | ○ |
| Beverage 16 | 100 | 30 | 100 | ○ | 10 | ○ |
| Comparative beverage 2 | 100 | 100 | 30 | Δ | 100 | Δ |

In Table 2, as in Table 1, a viscosity as measured using an E-type viscometer (Viscometer TV-25 type L manufactured by Toki Sangyo Co., Ltd.) under conditions of a temperature of 20° C. and a shear rate of 50/s is represented by A [mPa·s], and a viscosity as measured using the E-type viscometer under conditions of a temperature of 20° C. and a shear rate of 100/s is represented by B [mPa·s].

The viscosity A and the viscosity B of the beverages 11 to 16 were adjusted by changing the blending amounts of the first thickening agent and the second thickening agent.

[Beverage 11]

A thickened carbonated beverage packed in a container was prepared according to the same composition and procedure as the beverage 1, except that the blending amount of welan gum was 0.13 part by mass and the blending amount of locust bean gum was 0.33 part by mass.

[Beverage 12]

A thickened carbonated beverage packed in a container was prepared according to the same composition and procedure as the beverage 1, except that the blending amount of welan gum was 0.17 part by mass and the blending amount of locust bean gum was 0.30 part by mass.

[Beverage 13]

A thickened carbonated beverage packed in a container was prepared according to the same composition and procedure as the beverage 1, except that the blending amount of welan gum was 0.23 part by mass and the blending amount of locust bean gum was 0.23 part by mass.

[Beverage 14]

A thickened carbonated beverage packed in a container was prepared according to the same composition and procedure as the beverage 1, except that the blending amount of welan gum was 0.27 part by mass and the blending amount of locust bean gum was 0.20 part by mass.

[Beverage 15]

A thickened carbonated beverage packed in a container was prepared according to the same composition and procedure as the beverage 1, except that the blending amount of welan gum was 0.33 part by mass and the blending amount of locust bean gum was 0.13 part by mass.

[Beverage 16]

A thickened carbonated beverage packed in a container was prepared according to the same composition and procedure as the beverage 1, except that the blending amount of welan gum was 0.37 part by mass and the blending amount of locust bean gum was 0.10 part by mass.

In all the beverages 11 to 16, the viscosities of the stock liquids were sufficiently low, as in Example 1. Therefore, a sufficient amount of carbon dioxide gas was dissolved in the stock liquids in the subsequent step of dissolving carbon dioxide gas, and the carbonated aqueous solution did not spill out of the container in the subsequent step of filling the container. As described above, according to the method of the present invention, it is possible to stably produce a thickened carbonated beverage packed in a container with a sufficient amount of carbon dioxide gas contained in the beverage.

[Comparative Beverage 2]

A thickened carbonated beverage packed in a container was prepared according to the same composition and procedure as the comparative beverage 1, except that the blending amount of tamarind seed gum was 0.47 part by mass.

2-2. Sensory Evaluation

As in Example 1, a sensory evaluation was performed on the beverages 11 to 16 and the comparative beverage 2.

2-3. Evaluation Results

The results of the sensory evaluation are shown in Table 2 above.

In regard to the beverages 12 to 16, the value of "viscosity B/viscosity A" was ≤0.70, and the ease of swallowing was good. On the other hand, the viscosity A and the viscosity B of the comparative beverage 2 were the same even though the shear rates were different, and it was not felt that the beverage was easy to swallow.

In regard to the beverages 12 to 16, the difference between the viscosity B measured at a shear rate of 100/s and the viscosity A measured at a shear rate of 50/s was larger than that of the beverage 11, and the beverages 12 to 16 were easy to swallow and not sticky when swallowed. Thus, the swallowability was very good.

Example 3

In Example 3, a beverage whose viscosity A measured at a shear rate of 50/s was 300 [mPa·s] will be described as examples.

3-1. Preparation of Thickened Carbonated Beverage Packed in Container

Beverages 17 to 20 having the viscosity shown in Table 3 below were prepared using welan gum as the first thickening agent and locust bean gum as the second thickening agent. Also, a comparative beverage 3 having the viscosity shown in Table 3 below was prepared using only cold-water-soluble tamarind seed gum as a thickening agent.

TABLE 3

|  | Viscosity | | Percentage [%] of people who said the beverage was easy to swallow | Ease of swallowing | Percentage [%] of people who said the beverage was sticky | Stickiness |
| --- | --- | --- | --- | --- | --- | --- |
|  | A [mPa·s] (at shear rate of 50/s) | B [mPa·s] (at shear rate of 100/s) | | | | |
| Beverage 17 | 300 | 260 | 40 | Δ | 70 | Δ |
| Beverage 18 | 300 | 220 | 60 | ○ | 40 | ○ |
| Beverage 19 | 300 | 180 | 70 | ○ | 30 | ○ |
| Beverage 20 | 300 | 140 | 70 | ○ | 30 | ○ |
| Comparative beverage 3 | 300 | 300 | 30 | Δ | 100 | Δ |

In Table 3, as in Table 1, a viscosity as measured using an E-type viscometer (Viscometer TV-25 type L manufactured by Toki Sangyo Co., Ltd.) under conditions of a temperature of 20° C. and a shear rate of 50/s is represented by A [mPa·s], and a viscosity as measured using the E-type viscometer under conditions of a temperature of 20° C. and a shear rate of 100/s is represented by B [mPa·s].

The viscosity A and the viscosity B of the beverages 17 to 20 were adjusted by changing the blending amounts of the first thickening agent and the second thickening agent.

[Beverage 17]

A thickened carbonated beverage packed in a container was prepared according to the same composition and procedure as the beverage 1, except that the blending amount of welan gum was 0.3 part by mass and the blending amount of locust bean gum was 1.10 parts by mass.

[Beverage 18]

A thickened carbonated beverage packed in a container was prepared according to the same composition and procedure as the beverage 1, except that the blending amount of welan gum was 0.50 part by mass and the blending amount of locust bean gum was 0.90 part by mass.

[Beverage 19]

A thickened carbonated beverage packed in a container was prepared according to the same composition and procedure as the beverage 1, except that the blending amount of welan gum was 0.70 part by mass and the blending amount of locust bean gum was 0.70 part by mass.

[Beverage 20]

A thickened carbonated beverage packed in a container was prepared according to the same composition and procedure as the beverage 1, except that the blending amount of welan gum was 0.90 part by mass and the blending amount of locust bean gum was 0.50 part by mass.

In all the beverages 17 to 20, the viscosities of the stock liquids were sufficiently low, as in Example 1. Therefore, a sufficient amount of carbon dioxide gas was dissolved in the stock liquids in the subsequent step of dissolving carbon dioxide gas, and the carbonated aqueous solution did not spill out of the container in the subsequent step of filling the container. As described above, according to the method of the present invention, it is possible to stably produce a thickened carbonated beverage packed in a container with a sufficient amount of carbon dioxide gas contained in the beverage.

[Comparative Beverage 3]

A thickened carbonated beverage packed in a container was prepared according to the same composition and procedure as the comparative beverage 1, except that the blending amount of tamarind seed gum was 1.40 parts by mass.

3-2. Sensory Evaluation

As in Example 1, a sensory evaluation was performed on the beverages 17 to 20 and the comparative beverage 3.

3-3. Evaluation Results

The results of the sensory evaluation are shown in Table 3 above.

In regard to the beverages 18 to 20, the value of "viscosity B/viscosity A" was ≤ about 0.73, and the ease of swallowing was good. On the other hand, the viscosity A and the viscosity B of the comparative beverage 3 were the same even though the shear rates were different, and it was not felt that the beverage was easy to swallow.

In regard to the beverages 18 to 20, the difference between the viscosity B measured at a shear rate of 100/s and the viscosity A measured at a shear rate of 50/s was larger than that of the beverage 17, and the beverages 18 to 20 were easy to swallow and not sticky when swallowed. Thus, the swallowability was very good.

From the results of Examples 1 to 3, it was found that the viscosity A and the viscosity B of the thickened carbonated beverages that exhibited very good swallowability, such as the beverages 3 to 10, the beverages 12 to 16, and the beverages 18 to 20, satisfied the following relations:

i) $100 \leq A \leq 300$, and ii) $B \leq (0.75 \times A)$, preferably $B \leq (0.73 \times A)$, preferably $(0.25 \times A) \leq B \leq (0.75 \times A)$, more preferably $(0.27 \times A) \leq B \leq (0.73 \times A)$.

Example 4

In Example 4, the influence of pH on viscosity stability was examined.

4-1. Preparation of Stock Liquid

Stock liquids of samples 21 to 24 were prepared so that the stock liquids had the pH shown in Table 4 below.

TABLE 4

| | pH of stock liquid | Viscosity [mPa · s] of carbonated beverage immediately after preparation [mPa · s] | Viscosity [mPa · s] of carbonated beverage after storage [mPa · s] | Viscosity stability of carbonated beverage |
|---|---|---|---|---|
| Sample 21 | 3.0 | 150 | 50 | Low |
| Sample 22 | 3.5 | 150 | 135 | High |
| Sample 23 | 4.0 | 150 | 140 | High |
| Sample 24 | 4.6 | 150 | 145 | High |

[Sample 21]
[Composition]
Water: 100 parts by mass
Welan gum: 0.35 part by mass
Locust bean gum: 0.35 part by mass
pH-Adjusting agent (citric acid): Added so that the pH of the stock liquid became a desired pH
[Procedure]
First, welan gum was added to water having a temperature of 20° C. and stirred to prepare an aqueous solution containing welan gum. Locust bean gum was added to the resultant aqueous solution containing welan gum, and was stirred to prepare a dispersion liquid of locust bean gum. The pH-adjusting agent was added to the resultant dispersion liquid of locust bean gum, so that the pH of the dispersion liquid was adjusted to 3.0. Through this procedure, the stock liquid was prepared.

4-2. Preparation of Thickened Carbonated Beverage Packed in Container

The stock liquid was sent to a cooling plate and cooled to a temperature of 0° C. Carbon dioxide gas was dissolved in the cooled stock liquid using a carbonator, to prepare a carbonated aqueous solution. The carbon dioxide gas was dissolved so that the gas volume of the carbonated aqueous solution was 2.0. A container was filled with the resultant carbonated aqueous solution, using a filler, and was sealed to prepare a carbonated aqueous solution packed in the container.

The resultant carbonated aqueous solution packed in the container was heated at a temperature of 95° C. for 30 minutes using a shower-type sterilizer, to perform heat sterilization. Thereafter, the carbonated aqueous solution packed in the container was cooled down to room temperature (20° C.), thereby completing a thickened carbonated beverage packed in the container.

The carbonated beverage completed had a viscosity of 150 [mPa·s] when measured using an E-type viscometer (Viscometer TV-25 type L manufactured by Toki Sangyo Co., Ltd.) under conditions of a temperature of 20° C. and a shear rate of 50/s.

[Sample 22]
A stock liquid was prepared according to the same composition and procedure as the sample 21, except that the pH of the stock liquid was adjusted to 3.5. Thereafter, the same procedure as for the sample 21 was performed to complete a thickened carbonated beverage packed in the container. The carbonated beverage completed had the same viscosity as that of the carbonated beverage of the sample 21.

[Sample 23]
A stock liquid was prepared according to the same composition and procedure as the sample 21, except that the pH of the stock liquid was adjusted to 4.0. Thereafter, the same procedure as for the sample 21 was performed to complete a thickened carbonated beverage packed in the container. The carbonated beverage completed had the same viscosity as that of the carbonated beverage of the sample 21.

[Sample 24]
A stock liquid was prepared according to the same composition and procedure as the sample 21, except that the pH of the stock liquid was adjusted to 4.6. Thereafter, the same procedure as for the sample 21 was performed to complete a thickened carbonated beverage packed in the container. The carbonated beverage completed had the same viscosity as that of the carbonated beverage of the sample 21.

4-3. Measurement of Viscosity

The carbonated beverages of the samples 21 to 24 completed were stored at a temperature of 20° C. for one month. The viscosity of each carbonated beverage after storage was measured. The measurement results are shown in Table 4 above.

4-4. Results

The carbonated beverages of the samples 22 to 24 showed smaller decreases in the viscosity after one month than the sample 21. Therefore, in view of the viscosity stability of the carbonated beverages, the pH of the stock liquid is preferably 3.5 to 4.6.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A method of producing a thickened carbonated beverage packed in a container, the method comprising:
dissolving a first thickening agent which is soluble in water having a temperature of 0 to 35° C. in water having a temperature of 0 to 35° C. equal to or higher than a temperature at which the first thickening agent can dissolve, thereby obtaining an aqueous solution containing the first thickening agent and having a temperature of 0 to 35° C., wherein the aqueous solution containing the first thickening agent has a viscosity of 20 to 150 [mPa·s] when measured by an E-type viscometer according to JIS Z8803: 2011 under conditions of a temperature of 20° C. and a shear rate of 50/s;
mixing the aqueous solution containing the first thickening agent and having a temperature of 0 to 35° C. with a second thickening agent which is insoluble in water in a temperature range of 0 to 35° C. but soluble in water at a temperature of 60° C. or more, thereby obtaining a stock liquid in which the first thickening agent is dissolved and the second thickening agent is dispersed, wherein the stock liquid has a viscosity of 20 to 150 [mPa·s] when measured by an E-type viscometer according to JIS Z8803: 2011 under conditions of a temperature of 20° C. and a shear rate of 50/s;

dissolving carbon dioxide gas in the stock liquid, thereby obtaining a carbonated aqueous solution in which the first thickening agent is dissolved and the second thickening agent is dispersed;

filling a container with the carbonated aqueous solution and sealing the container, thereby obtaining the carbonated aqueous solution packed in the container wherein the first thickening agent is dissolved in the carbonated aqueous solution and the second thickening agent is dispersed in the carbonated aqueous solution; and heating the carbonated aqueous solution packed in the container such that the carbonated aqueous solution has a temperature of 60° C. or more, thereby dissolving the second thickening agent in the carbonated aqueous solution.

2. The method according to claim 1, wherein:

the first thickening agent is at least one selected from the group consisting of welan gum, guar gum, cold-water-soluble type of iota carrageenan, lambda carrageenan, xanthan gum, cold-water-soluble type of tamarind seed gum, tara gum, and psyllium seed gum; and the second thickening agent is at least one selected from the group consisting of locust bean gum, heat-soluble type of iota carrageenan, native gellan gum, low-methoxyl pectin, and heat-soluble type of tamarind seed gum.

3. The method according to claim 1, wherein the stock liquid further includes an additive.

4. The method according to claim 1, wherein the stock liquid has a pH of 3.5 or more and less than 4.6.

5. The method according to claim 1, wherein the dissolving the carbon dioxide gas in the stock liquid is performed cooling the stock liquid to a temperature of 5° C. or less.

6. The method according to claim 1, wherein the heating is performed by heating the carbonated aqueous solution packed in the container for 1 to 40 minutes such that the carbonated aqueous solution has a temperature of 80 to 110° C.

7. The method according to claim 1, wherein all liquids containing the second thickening agent are maintained at a temperature of less than 60° C., in all steps prior to the heating.

8. The method according to claim 1, wherein all liquids containing the second thickening agent are maintained at a temperature of 0 or more and less than 60° C.

9. The method according to claim 1, wherein all liquids containing the second thickening agent are maintained at a temperature of 0 to 35° C.

* * * * *